US007863205B2

(12) United States Patent
Stewart et al.

(10) Patent No.: US 7,863,205 B2
(45) **Date of Patent: *Jan. 4, 2011**

(54) BALLISTIC-RESISTANT LAMINATE ASSEMBLIES AND PANELS

(75) Inventors: Ricky William Stewart, Mukilteo, WA (US); Lee Walker Brillhart, III, Seattle, WA (US); Ronald G. Krueger, New Braunfels, TX (US)

(73) Assignee: Ultimate Survival Technologies, LLC, Monroe, WA (US)

( * ) Notice: Subject to any disclaimer, the term of this patent is extended or adjusted under 35 U.S.C. 154(b) by 397 days.

This patent is subject to a terminal disclaimer.

(21) Appl. No.: 11/447,595

(22) Filed: Jun. 5, 2006

(65) Prior Publication Data

US 2008/0138566 A1 Jun. 12, 2008

Related U.S. Application Data

(63) Continuation-in-part of application No. 10/421,627, filed on Apr. 22, 2003, now Pat. No. 6,949,280, which is a continuation of application No. 09/528,782, filed on Mar. 17, 2000, now Pat. No. 6,562,435.

(60) Provisional application No. 60/125,403, filed on Mar. 20, 1999.

(51) Int. Cl.
*B32B 27/04* (2006.01)

(52) U.S. Cl. ............................ 442/135; 2/2.5; 428/105

(58) Field of Classification Search ................ 442/134, 442/135; 428/911; 2/2.5; 89/36.01, 36.02, 89/36.05
See application file for complete search history.

(56) References Cited

U.S. PATENT DOCUMENTS 4,453,271 A * 6/1984 Donzis .......................... 2/456
6,323,145 B1 * 11/2001 Popper et al. ............... 442/366

* cited by examiner

*Primary Examiner*—Arti Singh-Pandey
(74) *Attorney, Agent, or Firm*—Charles J. Rupnick, Attorney at Law

(57) ABSTRACT

A sheet of ballistic-resistant fiber strands includes a bi-directional array of bonding fibers interwoven with the ballistic-resistant fibers to form a fiber panel. In one embodiment, a sheet of laminated ballistic-resistant fibers is joined to the first sheet of laminated ballistic-resistant fibers with the ballistic-resistant fibers running in a second direction as compared to the first fibers. In yet another embodiment, individual laminated sheets of ballistic-resistant fibers are stitched together to form packets of sheets that may be used singularly or bundled together.

62 Claims, 12 Drawing Sheets

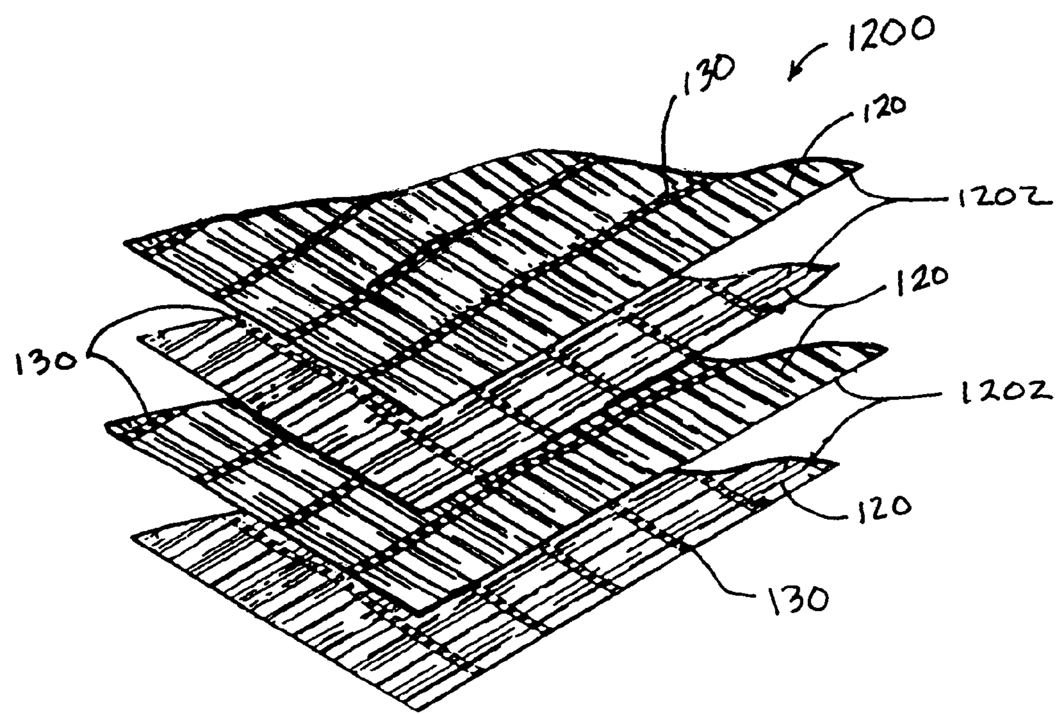
*Fig.* 12

BALLISTIC-RESISTANT LAMINATE ASSEMBLIES AND PANELS

CROSS-REFERENCE TO RELATED APPLICATION(S)

This application is a continuation-in-part application of U.S. patent application Ser. No. 10/421,627, entitled METHOD FOR FORMING OR SECURING UNIDIRECTIONALLY-ORIENTED FIBER STRANDS IN SHEET FORM, SUCH AS FOR USE IN A BALLISTIC-RESISTANT PANEL, filed Apr. 22, 2003, now U.S. Pat. No. 6,949,280 which is a continuation of U.S. patent application Ser. No. 09/528,782, entitled METHOD FOR FORMING OR SECURING UNIDIRECTIONALLY ORIENTED FIBER STRANDS IN SHEET FORM, SUCH AS FOR USE IN A BALLISTIC-RESISTANT PANEL, filed Mar. 17, 2002 now U.S. Pat. No. 6,562,435, which is incorporated herein in its entirety by reference, and which claims priority to U.S. Provisional Patent Application No. 60/125,403, filed Mar. 20, 1999 also incorporated herein in its entirety by reference.

TECHNICAL FIELD

This invention relates to forming or securing fiber strands in sheet form and, more particularly, to forming or securing fiber strands in sheet form for use in a ballistic-resistant laminate.

BACKGROUND OF THE INVENTION

Unidirectional fiber materials are used in ballistic-resistant structures and are disclosed, e.g., in U.S. Pat. Nos. 4,916,000, 4,079,161, 4,309,487, and 4,213,812. A non-woven ballistic-resistant laminate referred to by the trademark "Spectra-Shield" is manufactured by Allied-Signal, Inc. The laminate structure is used in soft body armor to protect the wearer against high-velocity bullets and fragments. "Spectra-shield" was made by first forming a non-woven unidirectional tape, which was composed of unidirectional polyethylene fibers and an elastic resin material that held the fibers together. The resin penetrated the fibers, effectively impregnating the entire structure with the resin product. Two layers, or arrays, of the unidirectional tape were then laminated together (cross-plied) at right angles to form a panel. The panel was then covered on both sides with a film of polyethylene. The film prevented adjacent panels from sticking together when the panels were layered in the soft body armor. The final panel was heavier and stiffer than desired for use as a ballistic-resistant panel. The weight and stiffness were due in part to the penetration of the entire structure with the resin product.

Non-woven ballistic-resistant laminates without resins are disclosed, e.g., in U.S. Pat. Nos. 5,437,905, 5,443,882, 5,443,883, and 5,547,536. A sheet of non-woven ballistic-resistant laminate structure was constructed of high performance fibers without using resins to hold the fibers together. Instead of resin, thermoplastic film was bonded to outer surfaces of two cross-plied layers of unidirectional fibers to hold the fibers in place. The film did not penetrate into the fibers. A sufficient amount of film resided between the bonded layers to adhere the layers together to form a sheet. Bonding the two layers of unidirectional fibers cross-plied to one another was necessary to meet structural requirements of the ballistic-resistant panel, such as impact force distribution. The individual sheets were placed loosely in a fabric envelope of an armored garment to form a ballistic-resistant panel.

SUMMARY

A ballistic-resistant laminate assembly is provided that overcomes drawbacks experienced in the prior art and achieves other benefits. One aspect of the invention provides a ballistic-resistant laminate assembly having a first layer with a plurality of ballistic-resistant fiber strands positioned adjacent to each other, a plurality of first bonding strips, and a plurality of second bonding strips. The first bonding strips are spaced apart from each other by a selected distance and are at a first orientation with the fiber strands. The second bonding strips are cross-plied relative to the first bonding strips to form a bi-directional array of bonding strips connected to the fiber strands. The second bonding strips are spaced apart from each other by a selected distance and are connected to the fiber strands at a predetermined angle relative to the fiber strands. In one embodiment, the first and second bonding fibers include ballistic-resistant fibers coated with an adhesive material. In one embodiment, the first and second bonding strips are bonding fibers configured in a woven arrangement with the fiber strands. A first laminate film is positioned on one side of the fiber strands and bonded to the first layer. A second laminate film is positioned adjacent to a side of the fiber strands opposite the first laminate film.

BRIEF DESCRIPTION OF THE DRAWINGS

FIG. 11 is an armored body garment under one embodiment of the invention.

FIG. 12 is a partial, exploded isometric view of another embodiment having a plurality of ballistic-resistant fiber panels joined together.

DETAILED DESCRIPTION

Figure 1:
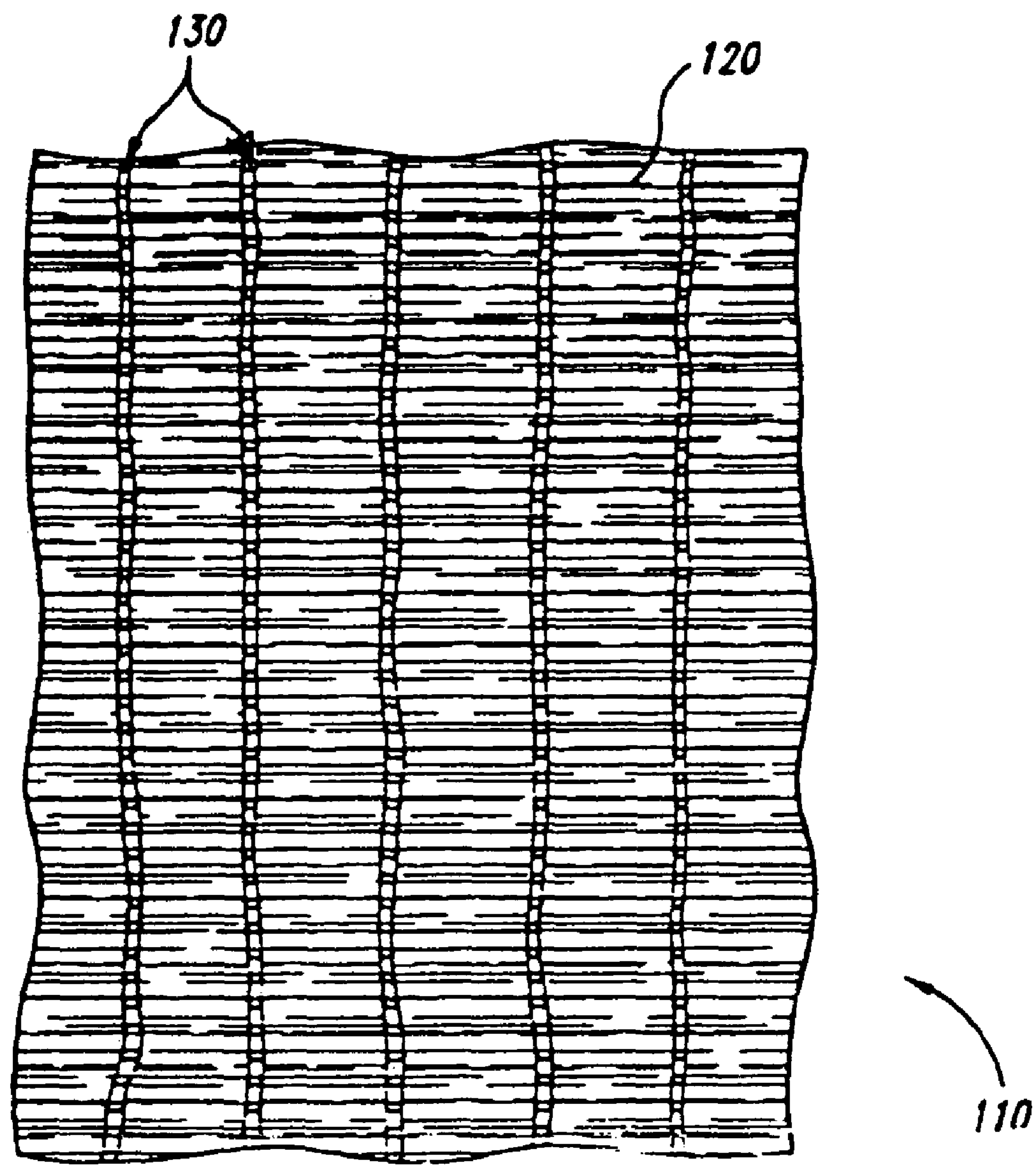
FIG. 1 is a plan view of a ballistic-resistant fiber panel with ballistic-resistant fiber strands and bonding fibers connected to the fiber strands according to one embodiment of the invention.

The inventors have found limitations and inefficiencies with respect to the performance and to the manufacturing of the prior art ballistic-resistant panels. The prior art laminated panels gave structure to the unidirectional fibers and served to prohibit adjacent sheets from sticking together, but they also facilitated movement between the sheets. Thus, the initial impact from, e.g., a bullet to a ballistic-resistant panel comprised of loose laminated sheets displaced and rotated the sheets within the pocket such that the anti-ballistic characteristics were compromised for subsequent bullets. Additionally, the impact from the bullet bunched and pulled the individual fiber strands in the sheets and further degraded the integrity of the ballistic panel.

When an armor vest is tested in accordance with nationally recognized standards, the vest is shot six times at a preestablished distance and in a specific shot pattern. The inventors found with the prior art that, when the bullet pulled the fibers toward entry, the bullet significantly weakened the areas that fibers were pulled from such that by the fourth and fifth shots, bullets penetrated a raised weakened strike area. Further, in the absence of resins or adhesives, the number of fibers per inch in a panel must be reduced to get opposing laminated sheets to fuse together. Increasing the density of the fibers to improve ballistic performance resulted in a panel that delaminated. To form the prior art sheets, fiber spools were unwound as thermoplastic sheets simultaneously laminated the fibers to provide alternating layers of fibers and thermoplastic sheets. It was not always feasible, economical, or ballistically prudent to simultaneously bond the thermoplastic film on one side of the unspooling fibers. Without the thermoplastic film, however, the unspooled fibers lacked structure and collapsed.

Under one aspect of the invention, a ballistic-resistant fiber panel includes a plurality of ballistic-resistant fiber strands and bonding strips, such as a plurality of bonding fibers connected to the fiber strands. Under another aspect of the invention, two thermoplastic sheets laminate the fiber panel between them. Under another aspect, one set of bonding strips is connected to the fiber strands at one predetermined angle, and a second set of bonding strips at another angle relative to fiber strands is cross-plied with the first bonding strips to form an array of bi-directional bonding strips connected to the ballistic-resistant fiber strands. Under yet another aspect of the invention, several of the laminated ballistic-resistant fiber panels are stitched or otherwise bound together to form packets. Methods for forming or securing ballistic-resistant fiber strands in sheet form are described in detail below. In the following description, numerous specific details are provided, such as specific uses, fiber orientations, numbers of layers, etc., to provide a thorough understanding of embodiments of the invention. One skilled in the relevant art will readily recognize that the invention can be practiced without one or more of the specific details. In other instances, well-known structures or operations are not shown or described in detail to avoid obscuring aspects of the invention.

As illustrated in FIG. 1, a flexible ballistic-resistant fiber panel 110 includes the bonding strips formed by bonding fibers 130 interwoven with strands of ballistic-resistant fibers 120. As the ballistic-resistant fibers 120 are unspooled, they may be passed through a comb guide where the ballistic-resistant fibers are further paralleled and spaced into a predetermined uniform density. In one embodiment, the ballistic-resistant fibers 120 are aramid fibers, with a 1000 denier fiber construction and approximately 17 ends/inch untwisted tows sheet construction. In another embodiment, the ballistic-resistant fibers 120 are aramid fibers, with a 840 denier fiber construction and approximately 20 ends/inch unidirectional untwisted tows sheet construction. In other embodiments, the ballistic-resistant fibers 120 can be high performance fibers having a tensile strength of at least 9 grams/denier.

As the ballistic-resistant fibers 120 are unspooled to form a fiber panel 110, the bonding fibers 130 are interwoven at an angle with respect to the ballistic-resistant fibers 120. In the illustrative embodiment, the bonding fibers 130 are interwoven perpendicular to the ballistic-resistant fibers 120 on approximately one-inch centers. Preferably the bonding fibers 130 are spaced one-half inch to two inches, and more preferably, the bonding fibers 130 are evenly spaced one inch apart. The bonding fibers 130 are positioned to alternatively go under and over adjacent sets of the ballistic-resistant fibers 120 in a woven arrangement, thereby providing a bi-directional, or multidirectional arrangement of fibers. In selected embodiments, the sets of ballistic-resistant fibers 120 that the bonding fibers go over or under have a width of about one-half inch to two inches, so as to substantially correspond to the distance between adjacent bonding fibers 130.

In one embodiment, the bonding fibers 130 are an ethylene vinyl acetate with a polyester core. The coating may be made of natural or manmade polymers, copolymers, waxes, or mixtures thereof. The coating is configured to at least partially coat and securely adhere to the ballistic-resistant fibers 120, thereby substantially holding the ballistic-resistant fibers together. Representative examples include, but do not limit the scope of use to, the following: styrene, butadiene, polybutadiene, polyvinylchloride, polyethylene, polypropylene, polyvinyl acetate (plasticized), acrylics, polyvinyl pyrrolidene compounds, natural latex, paraffin wax of the hot melt type, casein, carboxy cellulose esters, and ethers. The core may alternatively be constructed out of nylon, cotton, or aramid fiber or other high performance fibers having a tensile strength of at least 9 grams/denier. In other embodiments, the bonding fibers 130 are constructed of a ballistic-resistant fiber, such as an aramid fiber, with a coating of heat- or pressure-sensitive adhesive that will adhere to the ballistic-resistant fibers 120. The bonding fibers 130 can be substantially the same as the ballistic-resistant fibers 120. Alternately, the bonding fibers 130 can be a different size than the ballistic-resistant fiber 120.

After the bonding fibers 130 are interwoven with the ballistic-resistant fibers 120, they are bonded into a ballistic-resistant oriented fiber panel 110, for example, with heat and pressure from either static heat or an autoclave. The desired temperature range during heating is preferably up to 500° F., more preferably in the range of 225-375° F., and most preferably 265° F. under 45 psi of pressure. In addition to heat bonding the bonding fibers 130 to the ballistic-resistant fibers 120, bonding can be effected by other methods depending upon the particular chemical composition of the fiber's coating. For example, bonding can be done by moisture, the use of organic solvents, high-pressure alone, or contact pressure. Such bonding techniques, however, should not adversely affect the ballistic-resistant fibers 120 or destroy the configuration of the fibers that the bonding fibers 130 are to reinforce. Further, the coating of the bonding fibers 130 must bond with whatever surface coating or laminate is to be applied to the ballistic-resistant fiber panel 110.

Interweaving the bonding fibers 130 with the ballistic-resistant fibers 120 allows the fiber panel 110 to be handled, transported, and processed either at a different location or at a later time. This feature provides advantages, including both efficiency and economy. Under traditional manufacturing methods, it was necessary to secure the thermoplastic film onto one side of the fibers at the same time the ballistic-resistant fibers were unspooled to provide structure for the ballistic-resistant fibers and to preserve the sheet configuration of the fibers. The bonding fibers 130 provide this structure to the ballistic-resistant fibers 120. Thus, a thermoplastic film may be laminated to the ballistic-resistant fibers 120 either at the same time as the ballistic-resistant fibers 120 are unspooled or at a later time.

Figure 2A:
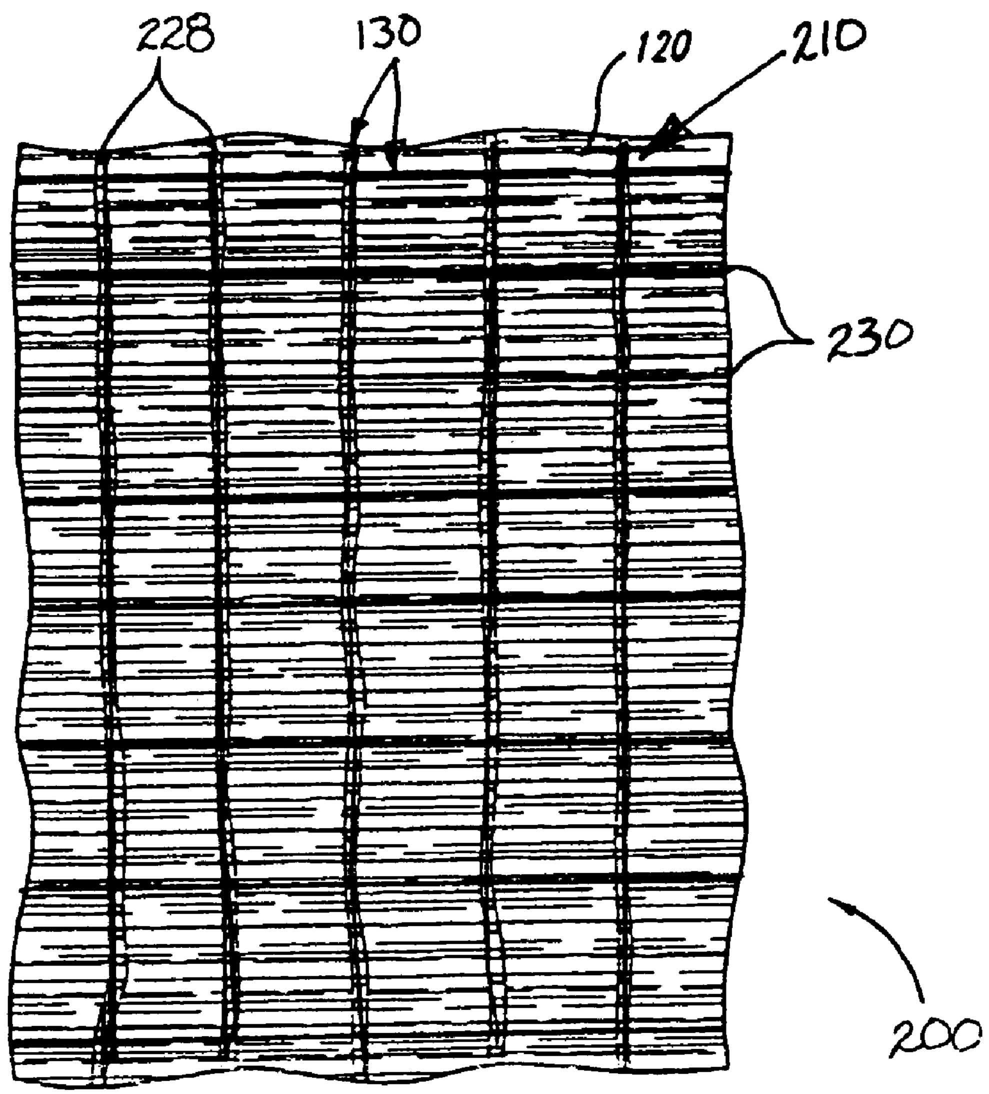
FIG. 2A is a plan view of a ballistic-resistant fiber panel with ballistic-resistant fiber strands and an array of bi-directional bonding fibers connected to the fibers in accordance with another embodiment of the invention.

FIG. 2A is a plan view of a ballistic-resistant fiber panel 200, with a woven array of bi-directional bonding fibers 130 connected to the ballistic-resistant fibers 120 in accordance with another embodiment of the invention. In the illustrated embodiment, the bonding fibers 130 include a first set of spaced-apart bonding fibers 228 generally perpendicular to the ballistic-resistant fibers 120, although the bonding fibers can be oriented at another selected angle relative to the ballistic-resistant fibers. The fiber panel 200 also has a second set of spaced-apart bonding fibers 230 substantially parallel with the ballistic-resistant fibers 120. The first set of bonding fibers 230 is cross-plied and arranged in a woven configuration with the second set of bonding fibers 228 and with the ballistic-resistant fibers 120. The cross-plied bonding fibers 228 and 230 form a bi-directional array 210 of bonding fibers that hold the ballistic-resistant fibers 120 in a parallel orientation. The fiber panel 200 can then be handled and manipulated in the manufacturing processes to form ballistic-resistant panels or the like. In one embodiment, the first and second sets of bonding fibers 228 and 230 are aramid fibers coated with selected adhesive, such as a heat and/or pressure sensitive adhesive.

Figure 2B:
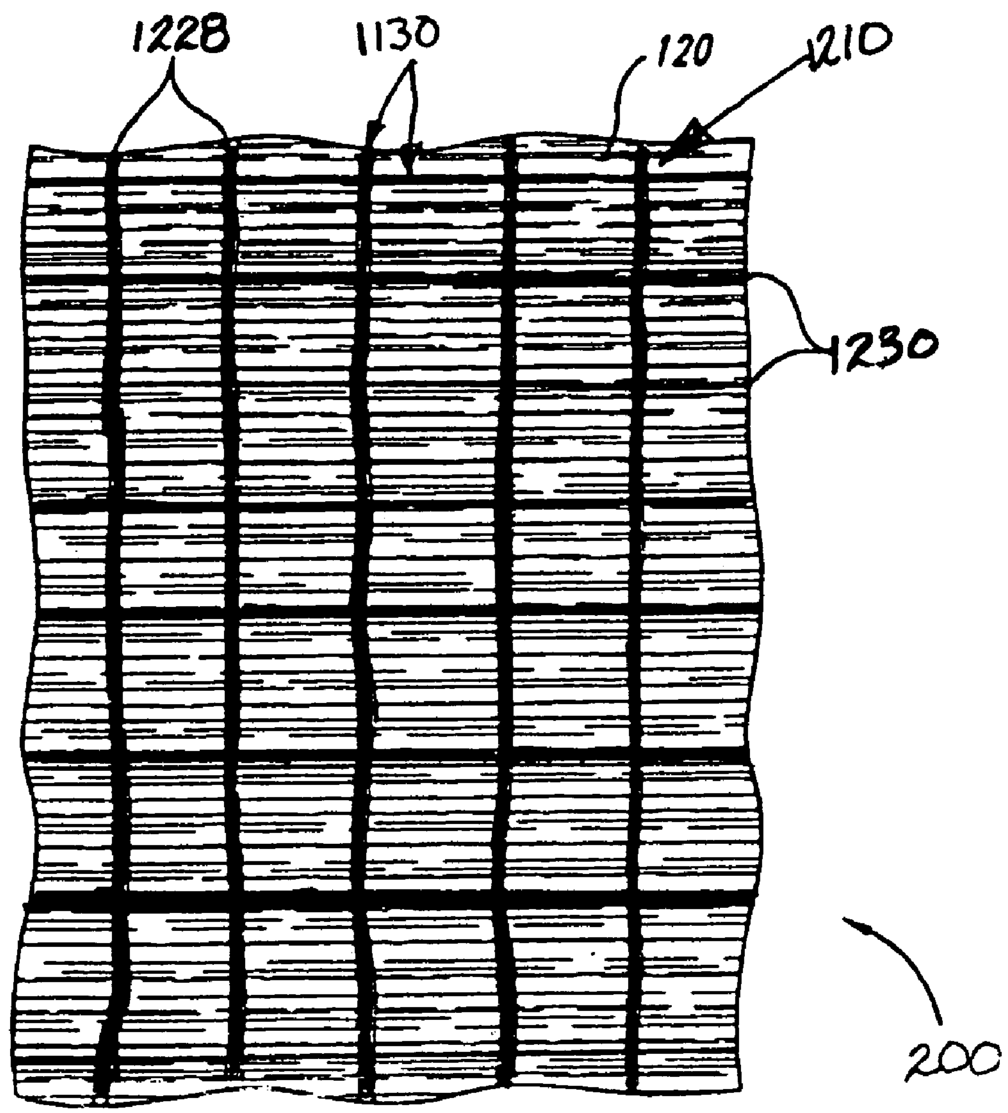
FIG. 2B is a plan view of a ballistic-resistant fiber panel in accordance with another embodiment of the invention.

In another embodiment shown in FIG. 2B, the ballistic-resistant fiber panel 200 has an array of bi-directional bonding strips 1130 connected to the ballistic-resistant fibers 120. In the illustrated embodiment, the bonding strips 1130 include a first set of spaced-apart bonding strips 1228 generally perpendicular to the ballistic-resistant fibers 120, although the bonding strips can be oriented at another selected angle relative to the ballistic-resistant fibers. The fiber panel 200 also has a second set of spaced-apart bonding strips 1230 substantially parallel with the ballistic-resistant fibers 120. The first set of bonding strips 1230 is cross-plied with the second set of bonding strips 1228 and with the ballistic-resistant fibers 120. In one embodiment, the first and second sets of bonding strips 1228 and 1230 are lengths of heat and/or pressure sensitive adhesive applied to the ballistic resistant fibers 120.

The bonding strips 1228 and 1230 of one embodiment can be applied the ballistic-resistant fibers 120 while the ballistic resistant fibers are being unspooled and arranged in the parallel configuration, or the bonding strips can be applied after the ballistic-resistant fibers have been arranged in the parallel configuration. The cross-plied bonding strips 1228 and 1230 form a bi-directional array 1210 of bonding strips that hold the ballistic-resistant fibers 120 in a parallel orientation. The fiber panel 200 can then be handled and manipulated in the manufacturing processes to form ballistic-resistant panels or the like. The bonding strips 1228 and 1230 of different embodiments can be fibrous or non-fibrous. The bonding strips 1228 and 1230 in selected embodiments can be applied in a liquid or semi-liquid format to form spaced-apart stripes of bonding material that act, inter alia, to hold the ballistic-resistant fibers 120 together. In other embodiments the bonding strips 1228 and 1230 can be elongated lengths of material, such as a tape-like material, applied to the ballistic resistant fibers 120 during or after the ballistic-resistant fibers are arranged in the parallel configuration.

Figure 2C:
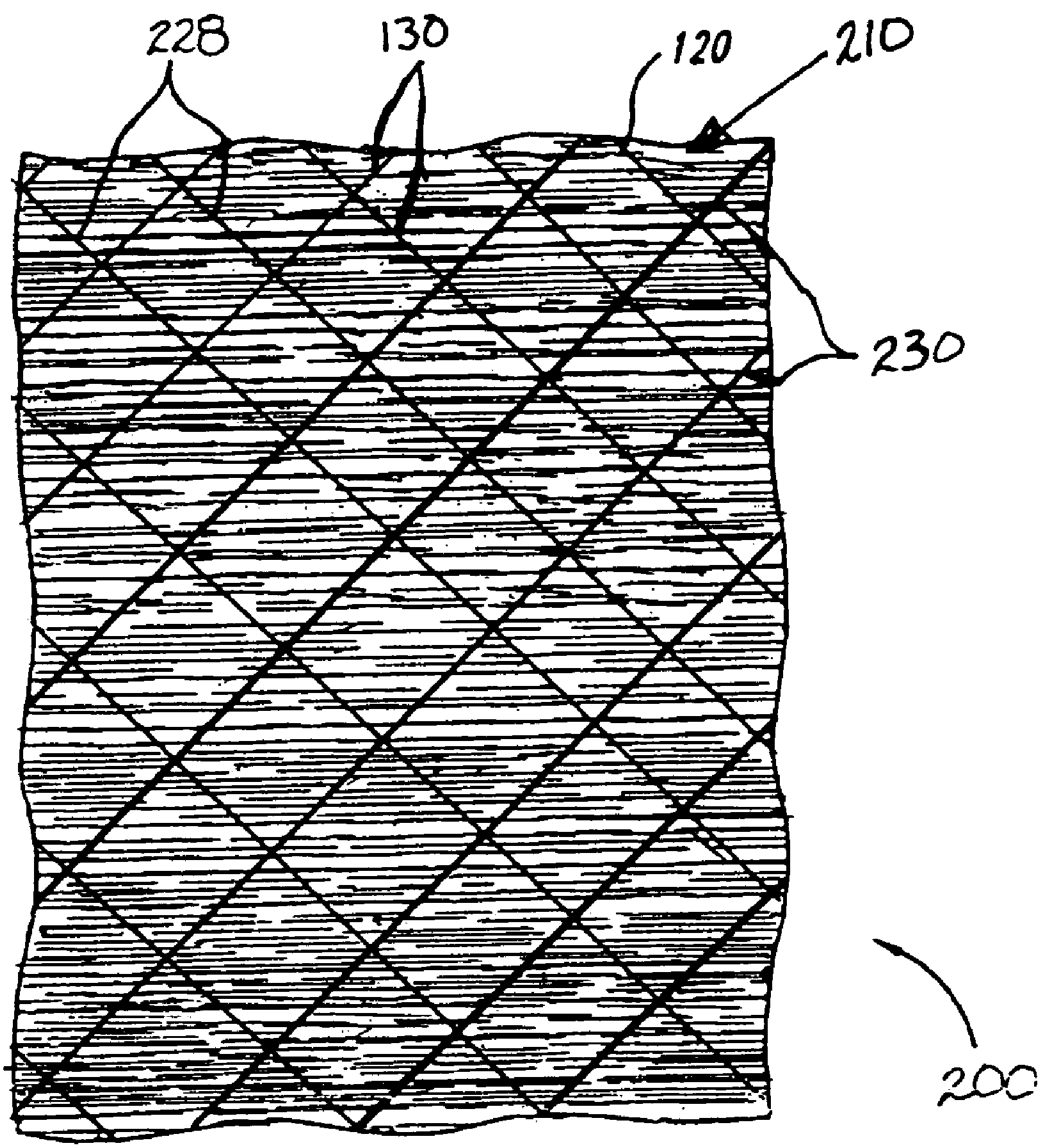
FIG. 2C is a plan view of a ballistic-resistant fiber panel in accordance with another embodiment of the invention.

In another embodiment shown in FIG. 2C, the ballistic-resistant fiber panel 200 has the first set of spaced-apart bonding fibers 228 oriented at an angle relative to the ballistic-resistant fibers 120. The bonding fibers 228 in the illustrated embodiment are made of ballistic-resistant fibers, such as aramid fibers, coated with a selected heat and/or pressure sensitive adhesive. In one embodiment, the angle of the first set of bonding fibers 228 is generally between 0 degrees and 90 degrees. In another embodiment, the angle is generally between approximately 30 degrees and 60 degrees, inclusive. The first set of bonding fibers 228 can be woven with the ballistic-resistant fibers 120. The second set of spaced-apart bonding fibers 230 are oriented at second angle relative to the ballistic-resistant fibers 120 and are oriented at an angle relative to the first set of bonding fibers 228. Accordingly, the first and second sets of bonding fibers 228 and 230 provide a multi-axial array of bonding fibers.

The bonding fibers 230 in the second set are also made of ballistic-resistant fibers, such as aramid fibers, coated with a selected heat and/or pressure sensitive adhesive. The bonding fibers 230 in this embodiment are not perpendicular or parallel to the ballistic-resistant fibers 120. In one embodiment, the angle of the second set of bonding fibers 230 relative to the ballistic-resistant fibers 120 is between 90 degrees and 180 degrees. In another embodiment, the angle is between approximately 120 degrees and 150 degrees, inclusive. In one embodiment, the second set of bonding fibers 230 are woven with the ballistic-resistant fibers 120 and with the first set of bonding fibers 228. The first and second sets of bonding fibers 228 and 230 can be perpendicularly oriented relative to each other, or they can be oriented at other angles to provide the bi-directional woven array of bonding fibers. Accordingly, the ballistic-resistant fibers and the first and second sets of bonding fibers 228 and 230 in the illustrated embodiment form a triaxial array of ballistic resistant fibers that form the ballistic-resistant fiber panel.

In another embodiment, a ballistic-resistant panel is formed with the bonding fibers 120 and three or more sets of spaced apart bonding fibers made of ballistic-resistant fibers coated with a selected heat and/or pressure-sensitive adhesive. Each set of these spaced apart bonding fibers are angularly offset relative to each other and relative to the ballistic-resistant fibers 120. Accordingly, the ballistic-resistant panel is formed with a multi-axial array of ballistic-resistant bonding fibers.

In one embodiment, the ballistic-resistant bonding fibers 228 and 230 can be made of the same material as the ballistic-resistant fibers 120 and coated with a selected adhesive coating. Alternatively, the bonding fibers 228 and 230 can be made of an adhesive-coated ballistic-resistant material having performance characteristics different than the ballistic-resistant fibers 120. As an example, the ballistic-resistant bonding fibers 228 and 230 can be coated aramid fibers with a smaller denier fiber construction and smaller diameter than the denier fiber construction and diameter of the ballistic-resistant fibers 120.

Figure 2D:
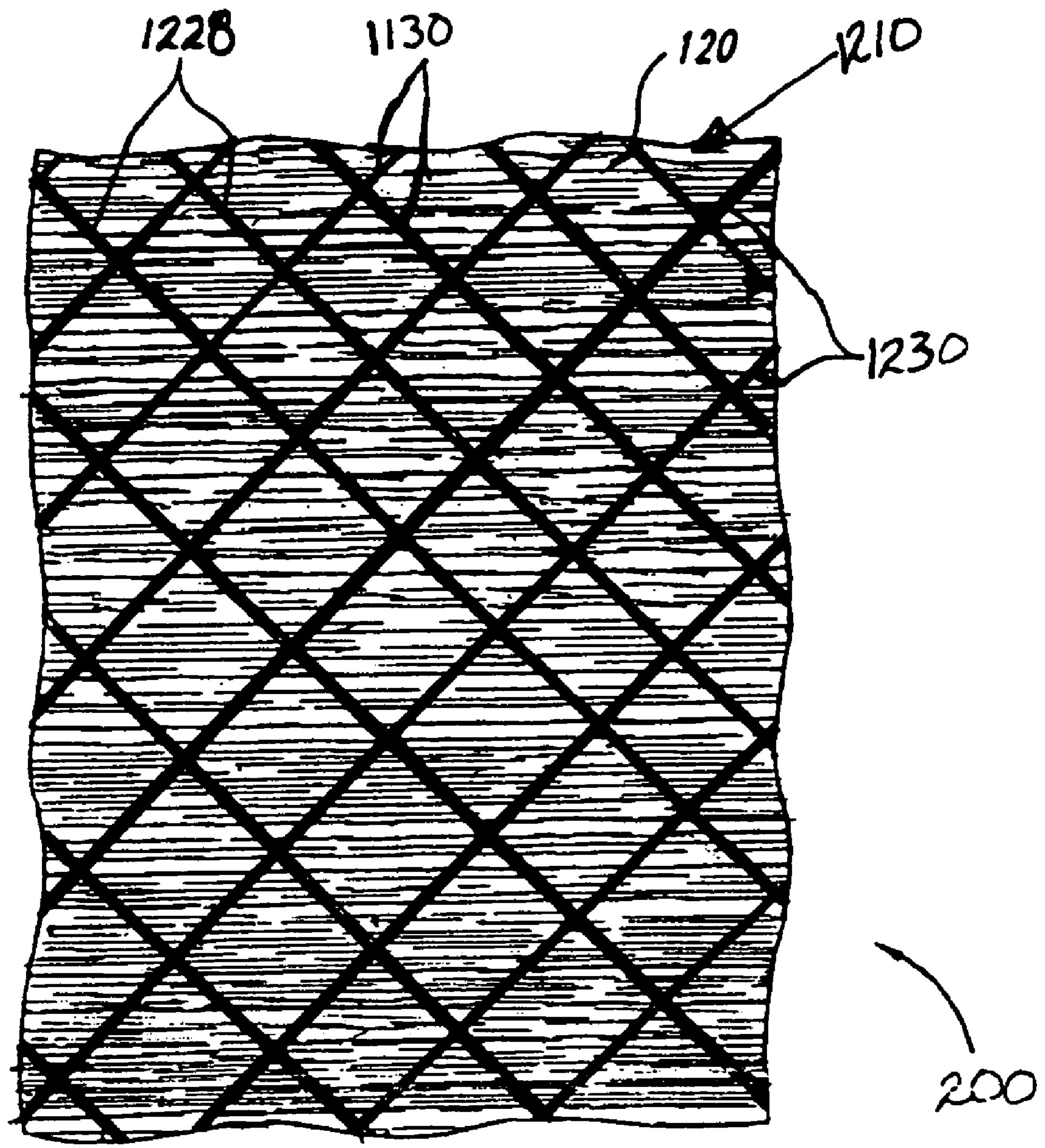
FIG. 2D is a plan view of a ballistic-resistant fiber panel in accordance with yet another embodiment of the invention.

In yet another embodiment shown in FIG. 2D, the ballistic-resistant fiber panel 200 has a first set of spaced-apart bonding strips 1228 oriented at an angle relative to the ballistic-resistant fibers 120. The bonding strips 1228 in the illustrated embodiment contain a selected heat and/or pressure sensitive adhesive. In one embodiment, the angle of the first set of bonding strips 1228 is generally between 0 degrees and 90 degrees. In another embodiment, the angle is generally between approximately 30 degrees and 60 degrees, inclusive. The first set of bonding strips 1228 can be applied during or after the ballistic-resistant fibers 120 are arranged in the parallel configuration. The second set of spaced-apart bonding strips 1230 are oriented at second angle relative to the ballistic-resistant fibers 120 and are oriented at an angle relative to the first set of bonding strips 1228. Accordingly, the first and second sets of bonding strips 1228 and 1230 provide a multi-axial array of bonding strips.

Figure 3:
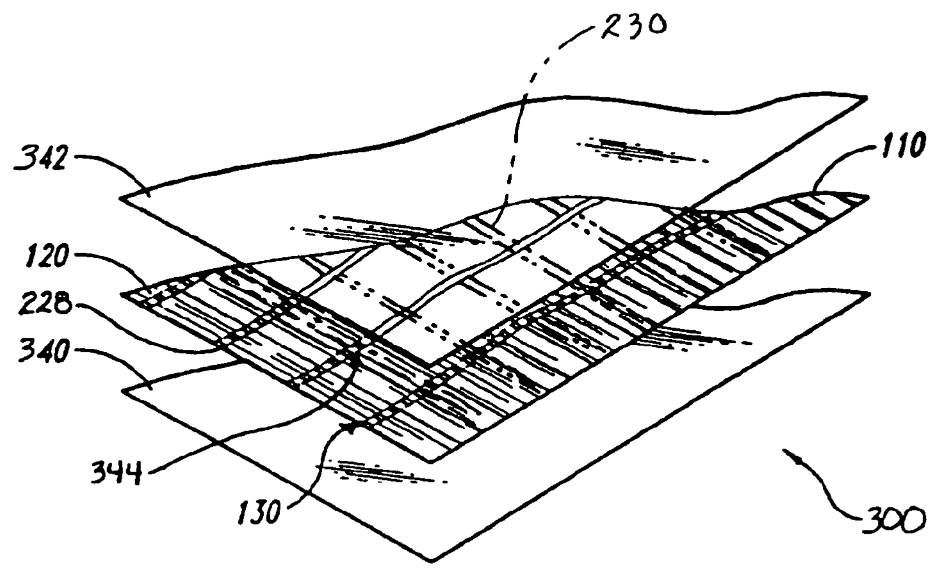
FIG. 3 is a partial, exploded isometric view of one embodiment including thermoplastic sheets laminating the ballistic-resistant fiber panel of FIG. 1.

As illustrated in FIG. 3, lower and upper thermoplastic films 340 and 342, respectively, are provided on bottom and top sides of the single fiber panel 110, and then secured or laminated thereto so that the ballistic-resistant fibers are securely sandwiched between the films to form a flexible, ballistic-resistant sheet 300. In one embodiment, the thermoplastic films 340 and 342 are extremely thin, typically less than 0.35 mils, to maintain the flexibility of the laminated ballistic-resistant sheet 300. Alternatively, thicker laminate films up to approximately 0.5 mils may be used to form a laminated fiber sheet of greater rigidity.

In one embodiment, the laminate film will coat the exterior surfaces of the ballistic-resistant fibers 120 to encapsulate them, but will not impregnate the fibers. Sufficient plasticized film material flows between adjacent ballistic-resistant fibers 120 to bond the thermoplastics films 340 and 342 to the ballistic-resistant fibers. The thermoplastic films 340 and 342 may be a polyethylene film. Due to the structure provided by bonding fibers 130 and 230 (shown in phantom lines in FIG. 3), the thermoplastic films 340 and 342 may be laminated over the ballistic-resistant fibers 120 either as the ballistic-resistant fibers are unspooled and interwoven with the bonding fibers 130 or at a later time. The thermoplastic films 240 and 242 laminate to each side of the ballistic-resistant fibers 120 to form the flexible, laminated, ballistic-resistant fiber sheet 300. The flexible sheet 300 may be used individually or may be combined with other sheets as described below, to form a variety of items, including ballistic-resistant panels.

The bonding fibers 130 further provide structure to which the thermoplastic films 340 and 342 can bond. Because the thermoplastic films 340 and 342 bond with the interwoven bonding fibers 130, the fiber panel 110 may contain a greater density of ballistic-resistant fibers 120. The bonding fibers 130 of these embodiments thus provide at least two functions: the bonding fibers help prevent the ballistic-resistant fiber panel from spreading or delaminating before and after the thermoplastic films 340 and 342 are laminated over the ballistic-resistant fibers 120, and the bonding fibers provide the panel enhanced buoyant characteristics. The greater density of the ballistic-resistant fibers 120 in the panel combine with the bonding fibers 130 to form interstitial air pockets 344 trapped between the laminate films 340 and 342.

The bonding fibers 130 allow the density of the ballistic-resistant fibers 120 to be maximized by giving the fiber panel 110 further structure while preventing delamination of the laminated fiber sheet 300 by bonding with the thermoplastic film. The bond between the thermoplastic sheets 340 and 342 and the bonding fibers 130 create equally spaced sealed interstitial air pockets that, when used in a ballistic panel, produce buoyant ballistic panels. In the embodiments shown in FIGS. 2A and 2B having the bi-directional woven array 210 of bonding fibers, both sets of the bonding fibers 228 and 230 act with the thermoplastic films 340 and 342 shown in FIG. 3 to form the interstitial air pockets 344 that provide the ballistic-resistant sheet 300 with a positive buoyancy. Accordingly, a plurality of ballistic-resistant sheets 300 can be joined together (as discussed in greater detail below) to form a flexible, ballistic-resistant panel having positive buoyancy. The buoyant flexible, ballistic-resistant panel can be used to make a selected assembly, such as a ballistic-resistant garment or the like.

The fiber panels 110, 200, and 300 discussed above are substantially flexible ballistic-resistant panels. In other embodiments, sufficient heat or heat with sufficient pressure can be applied to the thermoplastic films 340 and 342 for a sufficient duration to melt one or both of the thermoplastic films 340 and 342 into the ballistic-resistant fiber 120 to form a semi-rigid or rigid structure. Before heating the thermoplastic films 340 and 342, the laminated ballistic-resistant fiber sheet 300 may be configured into any variety of shapes. This semi-rigid or rigid structure may be used alone or may be used in combination with other panels to form any variety of items, including, but not limited to, cargo boxes, storage boxes, aircraft containers, water skis, snow skis, hockey sticks, vehicle bodies such as boat hulls, and protective elements such as helmets for racing, military use, or bicycling.

Figure 4:
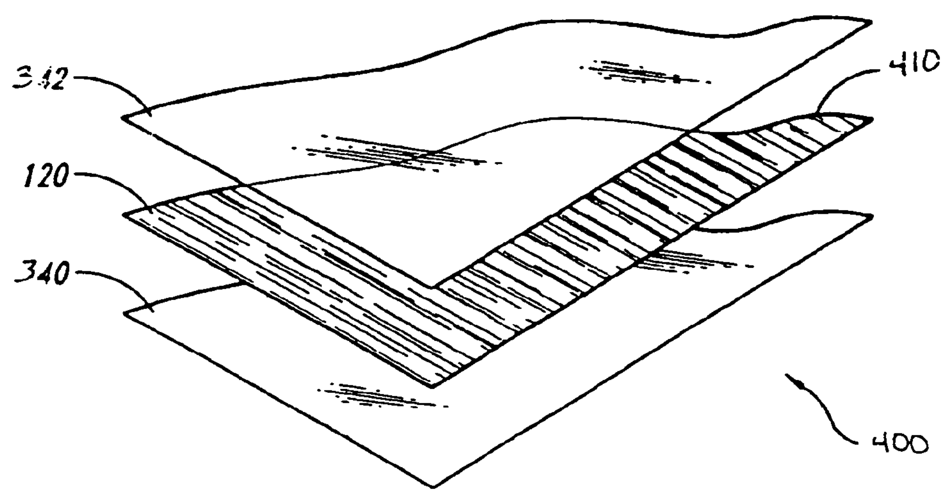
FIG. 4 is a partial, exploded isometric view of another embodiment of a laminated ballistic-resistant fiber panel without interwoven bonding fibers.

As illustrated in FIG. 4, another embodiment includes a fiber panel 410 of ballistic-resistant fibers 120 with lower and upper sheets of thermoplastic films 340 and 342 provided on a bottom and top surface of the fiber panel to form a flexible laminated ballistic-resistant fiber sheet 400. The ballistic-resistant fiber panel 410 laminated on both sides by thermoplastic films 340 and 342 provides a fiber sheet 400 with maximum flexibility while providing sufficient structure to prevent degradation of the fiber sheet's configuration. This ballistic-resistant fiber panel 410 may be used individually or in combination with other fiber panels disclosed herein. Alternatively, the thermoplastic films 340 and 342 may be heated such that the thermoplastic films will melt and encapsulate or impregnate the individual fiber strands 120 resulting in a substantially rigid sheet (not shown).

The decision to produce either a rigid or a flexible fiber sheet is typically dictated by the end use of the fiber sheet 400. Multiple pliable panels or sheets 110, 200, 300, or 400 can be used to form flexible ballistic-resistant panels used in a wearable garment, while providing ballistic protection to the wearer. Several sheets 110, 200, 300, or 400 in a rigid configuration can be used for other ballistic-related structures, such as helmets configured to fit the wearer's head.

Figure 5:
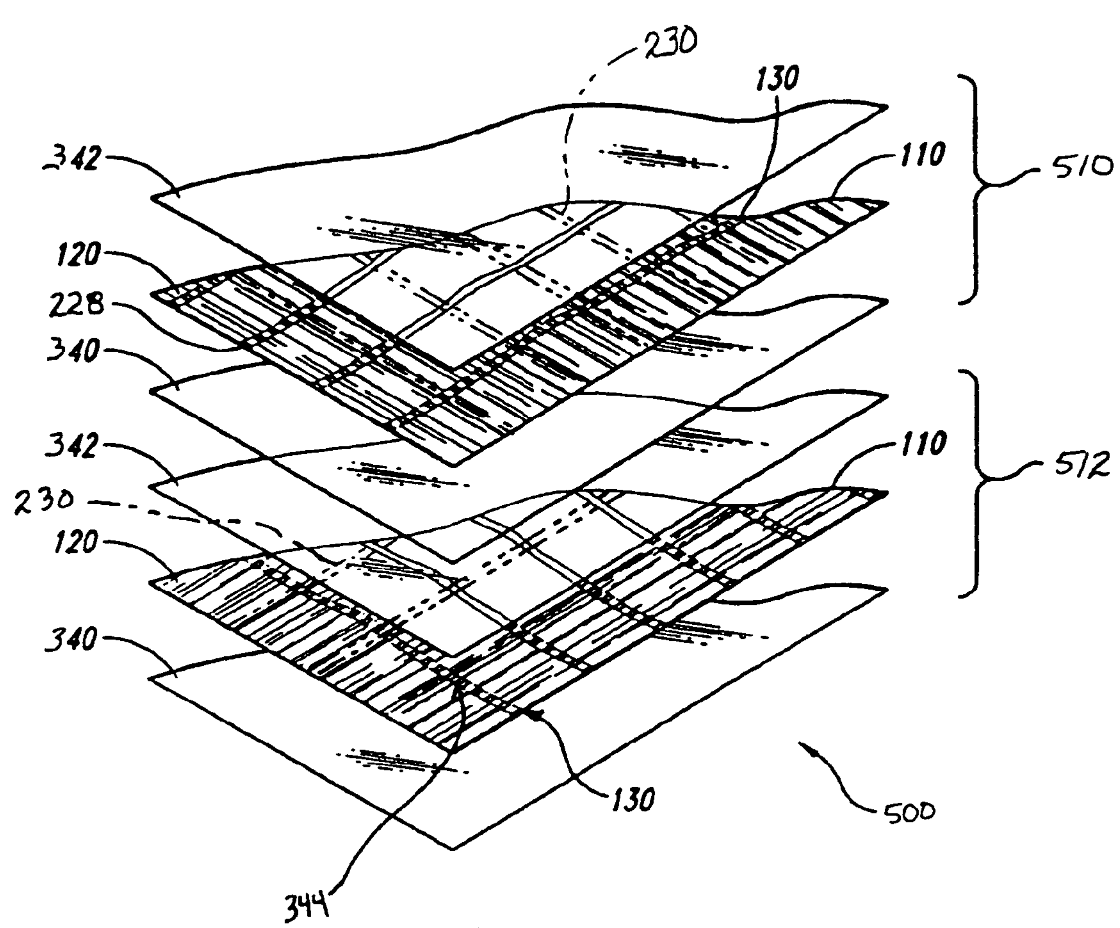
FIG. 5 is a partial, exploded isometric view of another embodiment of a laminated fiber panel including first and second sets of laminated ballistic-resistant fiber panels cross-plied relative to each together.

As illustrated in FIG. 5, another embodiment provides a ballistic-resistant, laminated panel 500 that has a first laminated fiber sheet 510 with ballistic-resistant fibers 120 oriented in a first direction (as illustrated in FIG. 1), and a second laminated ballistic-resistant fiber sheet 512 having ballistic-resistant fibers 120 oriented in a second direction. As illustrated, the sheets 510 and 512 each include bonding fibers 130 positioned substantially perpendicular to the ballistic-resistant fibers 120 and interwoven with the ballistic-resistant fibers 120. In the embodiments providing the array 210 of bi-directional bonding fibers 130 and 230, the cross-plied bonding fibers are substantially perpendicular to each other. Accordingly, one set of bonding fibers 230 is substantially parallel to the fiber strands 120, and the other set of bonding fibers 130 is substantially perpendicular to the fiber strands. In one embodiment, the bonding fibers 230 can be ballistic-resistant fibers angularly offset relative to the fiber strands 120, as discussed above with reference to FIG. 2B.

In one embodiment, the bonding fibers 130 are visual indicators that allow for easy confirmation that adjacent fiber panels 110 are cross-plied relative to each other. As an example, the bonding fibers 130 parallel to the ballistic-resistant fibers 120 in each laminated sheet 512 are colored differently than the ballistic-resistant fibers. Accordingly, when the two laminated sheets 510 and 512 are adjacent to each other, a person can quickly and easily determine whether the ballistic-resistant fibers 120 are cross-plied by looking at the relative orientation of the colored bonding fibers. If the colored bonding fibers 130 of each adjacent laminated sheet 510/512 are cross-plied relative to each other, the person knows that the ballistic-resistant fibers are properly cross-plied. In one embodiment adjacent fiber panels 110 can have different colored bonding fibers 130, and in alternate embodiments the bonding fibers in each fiber panel can have the same color although different from the ballistic-resistant fibers 120. In the embodiment having the bi-directional array 210 of bonding fibers 130, the bonding fibers can be configured so that some or all of the bonding fibers 230 parallel to the ballistic-resistant fibers 120 have a different color than the cross-plied bonding fibers 228 in that fiber panel 110.

The laminated panel assembly 500 of the illustrated embodiment has multiple cross-plied fiber panels 110, and each fiber panel 110 is laminated between lower and upper laminate films 340 and 342, thereby forming laminated sheets 510 and 512 with a configuration of film/fiber panel/film. Multiple laminated sheets 510, 512 can be joined together such that the ballistic-resistant fibers 120 of adjacent layers are cross-plied relative to each other. The resulting laminated sheet 500 has a lamination configuration of film/fiber panel/film/film/fiber panel/film . . . . The multiple laminated layers 510, 512 can be retained together by an adhesive provided between layers, or by stitching the layers together or by other laminating techniques. As discussed above, the bonding fibers 130 provide structure to the ballistic-resistant fibers 120 and allow the panel 110 to be manufactured without the thermoplastic film 340 or 342. Alternatively, if the thermoplastic film 340 or 342 is bonded to either a first or a second surface when the ballistic-resistant fibers 120 are unspooled and combined with the bonding fibers 130 in the weave pattern to form the ballistic-resistant panel 110, then the thermoplastic film may be used to provide additional structure to the panel.

When the ballistic-resistant fibers 120 are combined with the bonding fibers 130 in the weave pattern, layered on or between thermoplastic films 340 and 342, and laminated to produce a flexible sheet 500, the resulting flexible sheet is easy to handle without damaging, loosening, or substantially degrading the effectiveness of the ballistic-resistant fibers. The flexible, laminated sheet 500 is also quite buoyant because of the interstitial air pockets 344 trapped within the sheet between the laminate films 340 and 342.

Figure 6:
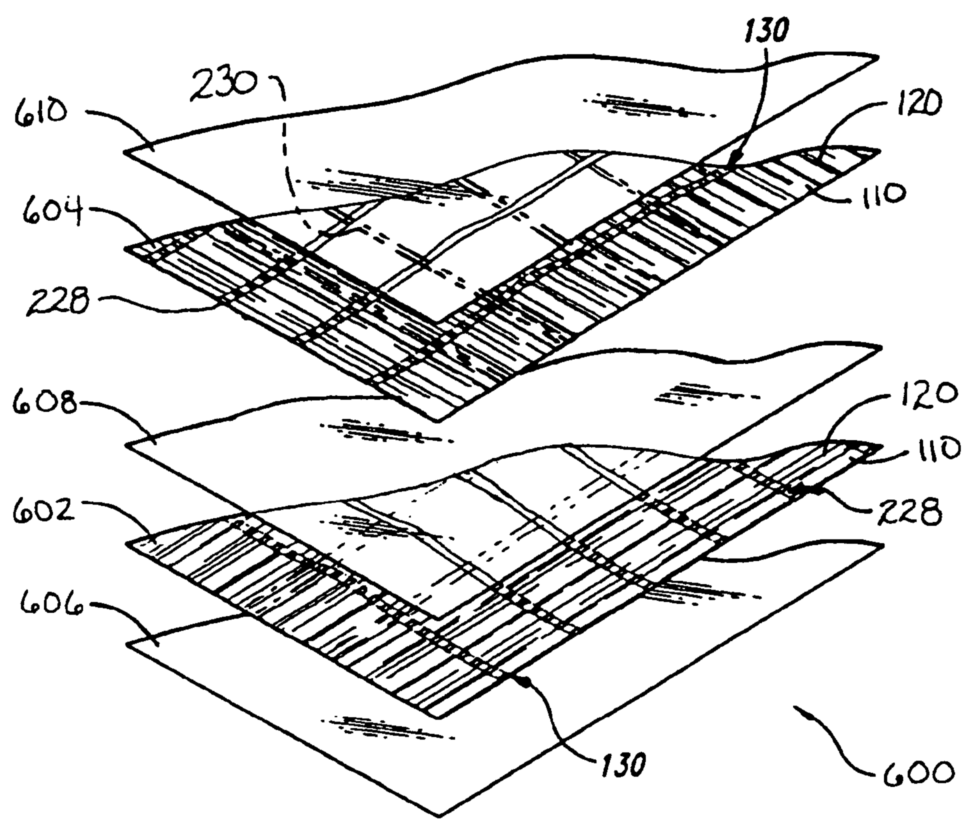
FIG. 6 is a partial, exploded isometric view of yet another embodiment of a laminated fiber panel with alternating layers of laminated ballistic-resistant fibers and laminate film.

FIG. 6 is a partial exploded isometric view of an alternate embodiment of a laminated fiber panel sheet 600. The laminated sheet 600 includes a first fiber panel 110 with the ballistic-resistant fibers 120 aligned in one direction. A second fiber panel 110 is cross-plied with the first fiber panel so that the ballistic-resistant fibers 120 of the second panel are substantially perpendicular to the ballistic-resistant fibers of the first panel. Accordingly, the laminated sheet 600 provides the cross-plied layers of the ballistic-resistant fibers 120. In other embodiments, the fiber panels 110 can be oriented with the ballistic-resistant fibers 120 at selected angles relative to each other, and not necessarily limited to a perpendicular orientation. In other embodiments, additional fiber panels 110 can be provided in the laminated sheet 600, and each fiber panel 110 can be selectively oriented in a cross-plied configuration relative to the adjacent layers as desired.

In the laminated sheet 600 as illustrated in FIG. 6, the first fiber panel 602 is bonded or otherwise adhered to a lower laminate film 606 such that the lower laminate film is attached to the bottom surface of the first fiber panel. A middle laminate film 608 is attached to the top surface of the first fiber panel 602, so that the first fiber panel is sandwiched between the lower and middle laminate films 606 and 608. The second fiber panel 604 is adhered along its bottom surface to the middle laminate film 608 so the middle laminate film is sandwiched between the first and second fiber panels 602 and 604. An upper laminate film 610 is adhered to the top surface of the second fiber panel 604. Accordingly, the structure of the laminated sheet 600 provides alternating layers of film and fiber panel to provide a configuration of film/fiber panel/film/fiber panel/film/ . . . with each successive fiber panel 110 being cross-plied relative to its adjacent fiber panels. Each of the fiber panels 602/604 can have the bonding fibers 130 or the array 210 of the bi-directional bonding fibers.

Figure 7:
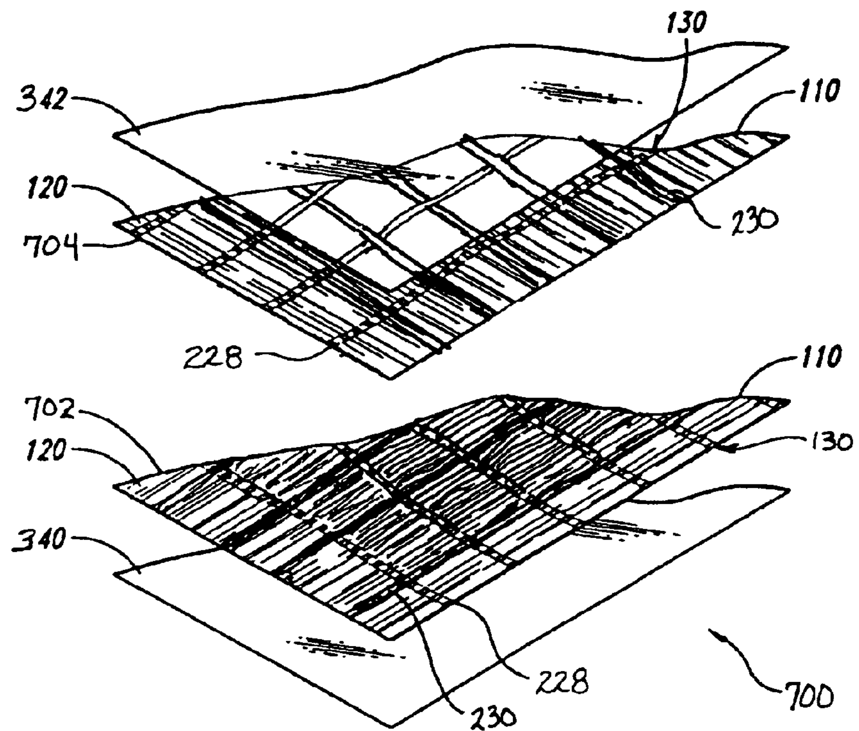
FIG. 7 is a partial, exploded isometric view of another embodiment of layers of laminated ballistic-resistant fibers and laminate films.

FIG. 7 is a partial exploded isometric view of another embodiment of a laminated sheet 700. The laminated sheet 700 includes a first ballistic-resistant fiber panel 702 directly attached to a second ballistic-resistant fiber panel 704 that has the ballistic-resistant fibers 120 cross-plied relative to the ballistic-resistant fibers of the first fiber panel. The bonding fibers 130/230 provide adhesive characteristics that at least partially bond the first and second fiber panels 702 and 704 together. The first and second laminated panels 702 and 704 can be provided with one set of spaced-apart bonding fibers 130 at a selected angle relative to the ballistic-resistant fibers 120 (e.g., perpendicular). In other embodiments, fiber panels 702 can include the array 210 of bonding fibers 130, as discussed above.

The laminated sheet 700 illustrated in FIG. 7 has a bottom laminate film 340 attached to the bottom surface of the first fiber panel 702, such that first fiber panel is between the laminate film and the second fiber panel 704. The laminated sheet 700 also has a top laminate film 342 attached to the top surface of the second fiber panel 704, such that the second fiber panel is between the top laminate film and the first fiber panel 702. Accordingly, the laminated sheet 700 has a lamination configuration of film\fiber panel\fiber panel\film. The laminated sheet 700 illustrated in FIG. 7 shows the use of only two laminated panels 702 and 704, although alternate embodiments can provide additional layers of fiber panels between the laminate films 340 and 342. The laminated sheet 700 can be a flexible sheet, but in other embodiments, the laminated sheet can be a semi-rigid or rigid structure.

Figure 8:
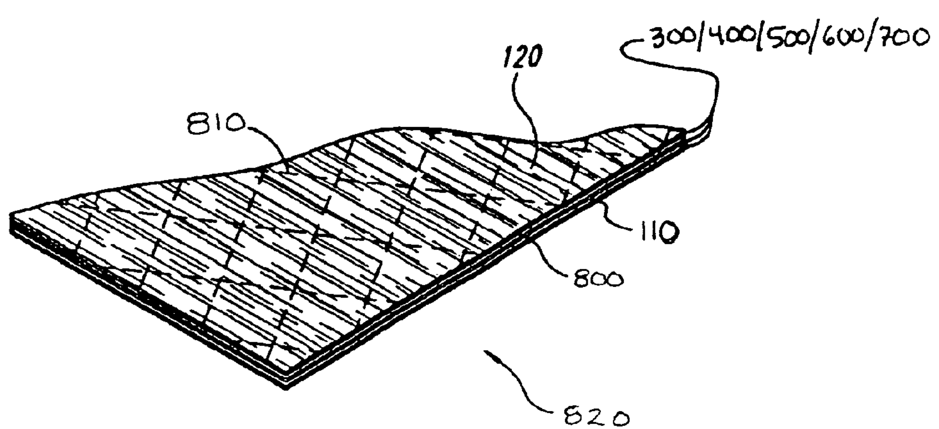
FIG. 8 is a partial isometric view of several laminated ballistic-resistant fiber panels stitched together to form a packet under one embodiment of the invention.

FIG. 8 is an isometric view of a stack of layers 800 of laminated sheets stacked on top of one another with the ballistic-resistant fibers 120 of each fiber panel 110 selectively oriented relative to the ballistic-resistant fibers of adjacent fiber panels, such as parallel, perpendicular, or at other angles. The stack of layers 800 can be made up of multiple layers of any one of the laminated fiber sheets 300, 400, 500, 600, and/or 700 discussed above, or any mixed combination of the laminated fiber sheets. The stack of layers 800 is secured together by stitches 810 to form a packet 820.

In another embodiment, adjacent sheets 300/400/500/600/700 can be secured together with an adhesive provided between the adjacent layers. The adhesive can be applied in selected patterns on the facing surfaces, so as to control the stiffness or rigidity of the resulting stack of layers 800. The stack of layers 800 adhered together can also be stitched together at selected locations or patterns as needed for the particular application for which the packet 820 is to be used. Further, any one of the sheets illustrated in FIGS. 1-7 may be used in any combination to form the packet 820. Specifically, when using the ballistic-resistant laminated sheets 500 illustrated in FIG. 5 to form the packet 820, preferably three to eight sheets are sewn together to form the packet 820, more preferably four to six panels, and most preferably five panels are used to form the packet. When using the ballistic-resistant fiber sheets 300 or 400 (FIG. 3 or 4) to form the packet 820 for use in a ballistic-resistant panel assembly, the sheets are placed such that the orientation of ballistic-resistant fibers is rotated a selected angle with respect to adjacent sheets.

Stitching the layers 800 together to form the packet 820 provides improved resistance to ballistic penetration in a ballistic panel with fewer total fiber panels required, as described below. In one embodiment, preferably four to ten packets of laminated sheets 500 are used to form a ballistic panel, more preferably four to eight packets and most preferably six packets are used to form a ballistic-resistant packet 820. When a bullet hits a ballistic-resistant panel 820, the bullet penetrates the initial layers 500 and the impact force of the bullet displaces secondary layers. When the ballistic-resistant panel 820 is made up of several individual ballistic-resistant fiber sheets or panels, the force of the bullet causes some fibers in the panel to push apart and separate and other fibers at the tip of the bullet to bunch. Adjacent fibers that the bullet does not actually penetrate are pulled out of position and weakened by the impact force of the bullet. This creates a path of reduced resistance through the panel. The result is that the integrity of the ballistic-resistant panel is significantly impaired after the first impact. Packets of ballistic-resistant fiber layers retain the benefit that the movement between the individual layers allows, i.e., shifting the bullet off course and diffusing the straight-line penetration of the bullet, while decreasing the penetration and the bunching caused by the bullet. The packets act like individual panels within the ballistic-resistant panel in that each individual packet acts independently of the adjacent packet. Thus the bullet's trajectory angles at each packet so that it does not create a path through the panel.

Fewer layers are used to form a ballistic-resistant panel of equivalent characteristics compared to prior systems; therefore, the resultant panel is more flexible and lighter in weight. When a bullet impacts a ballistic-resistant panel, the panel is subject to both the impact force of the bullet and a reverberating energy wave sent out ahead of the bullet. The components of the packet of this embodiment combine to provide a more efficient ballistic-resistant panel. Components include any one of or a combination of the following: density of the ballistic-resistant fibers in the panel, bonding thread, the cross-plied positioning of the fiber panels, thermoplastic films, the laminated fiber panels, and laminated panel assemblies stitched together in packets. The interaction between the individual packets works in a cooperative effort to provide an improved ballistic-resistant panel. Among other things, sewing the layers in a packet maximizes the anti-ballistic properties of the individual layers such that the resultant packet is stronger than the sum of the individual layers. Additionally, because fewer layers are required, the ballistic-resistant panel is less expensive to manufacture.

Stitching the layers 800 to form the packet 820 may be done by any variety of stitching patterns and is illustrated in FIG. 8 as a diamond pattern. An alternative pattern includes vertical stitching perpendicular to the ballistic-resistant fibers. Vertical stitching helps prevent the fibers from pulling side to side. Vertical stitches are preferably evenly spaced, more preferably evenly spaced 2"-4" apart and most preferably evenly spaced 3" apart. Stitching patterns may also include perimeter stitching, continuous and noncontinuous patterns, and any other variety of stitching patterns. In addition to stitching to secure the sheets together to form a packet, any one of a number of devices, including, but not limited to, the following may be used: staples (permanent plastic or metal); dry or wet adhesive applied directly or on strips such as double-sided tape; various patterns of bar tacks; interlocking tabs in the sheets themselves or slots in the laminate; heat-fusible thread on the exterior of select sheets; stacking two or more thermoplastic films and applying heat while pressing them together and taking advantage of the "sticky" properties of the film element of the laminate; fine Velcro or similar hook and loop material between the layers of sheets, snaps, any permutations and/or combinations of all the above devices; induced static electrical charge; and interwoven magnetic material. Additionally, a wide variety of materials may be used for the stitching thread, including natural and manmade fiber threads, polymer-based threads (such as fishing line), fine steel or other metal or composite or alloy wire, and racket sports string (including natural, such as catgut, and synthetic materials).

Figure 9:
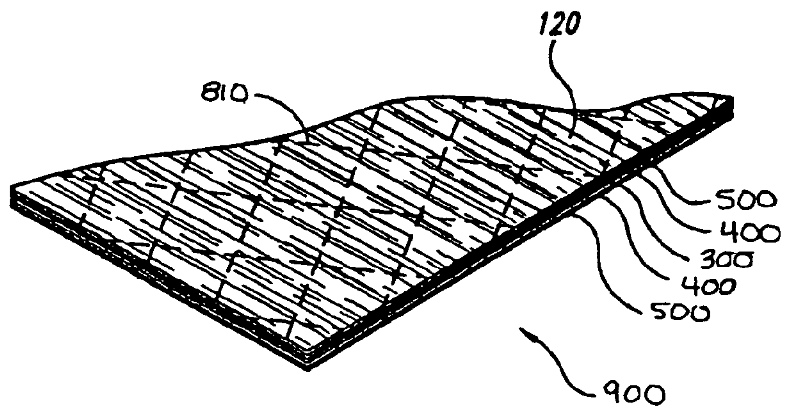
FIG. 9 is a partial isometric view of another embodiment of several laminated ballistic-resistant fiber panels stitched together.

FIG. 9 illustrates another embodiment of a packet 900 of several ballistic-resistant fiber sheets affixed together. As discussed above, any combination of sheets may be used to form the packet 900, including, but not limited to, this illustrated combination layering of different sheets 500, 400, 300, 400 and 500. As the individual sheet configurations have specific features or strengths, the positioning of the sheets within the packet will serve to highlight those features or strengths.

Figure 10:
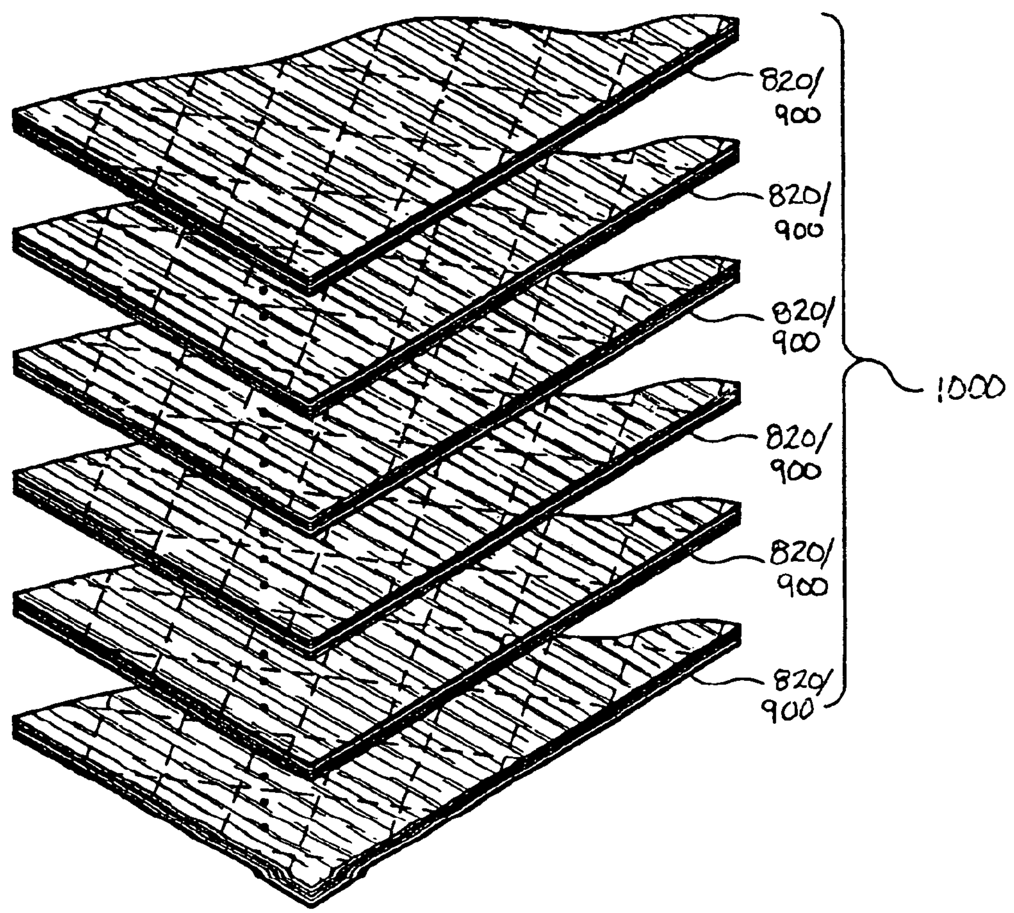
FIG. 10 is a partial, exploded isometric view of yet another embodiment of several stitched-together packets of laminated ballistic-resistant fiber panels.
Figure 11:
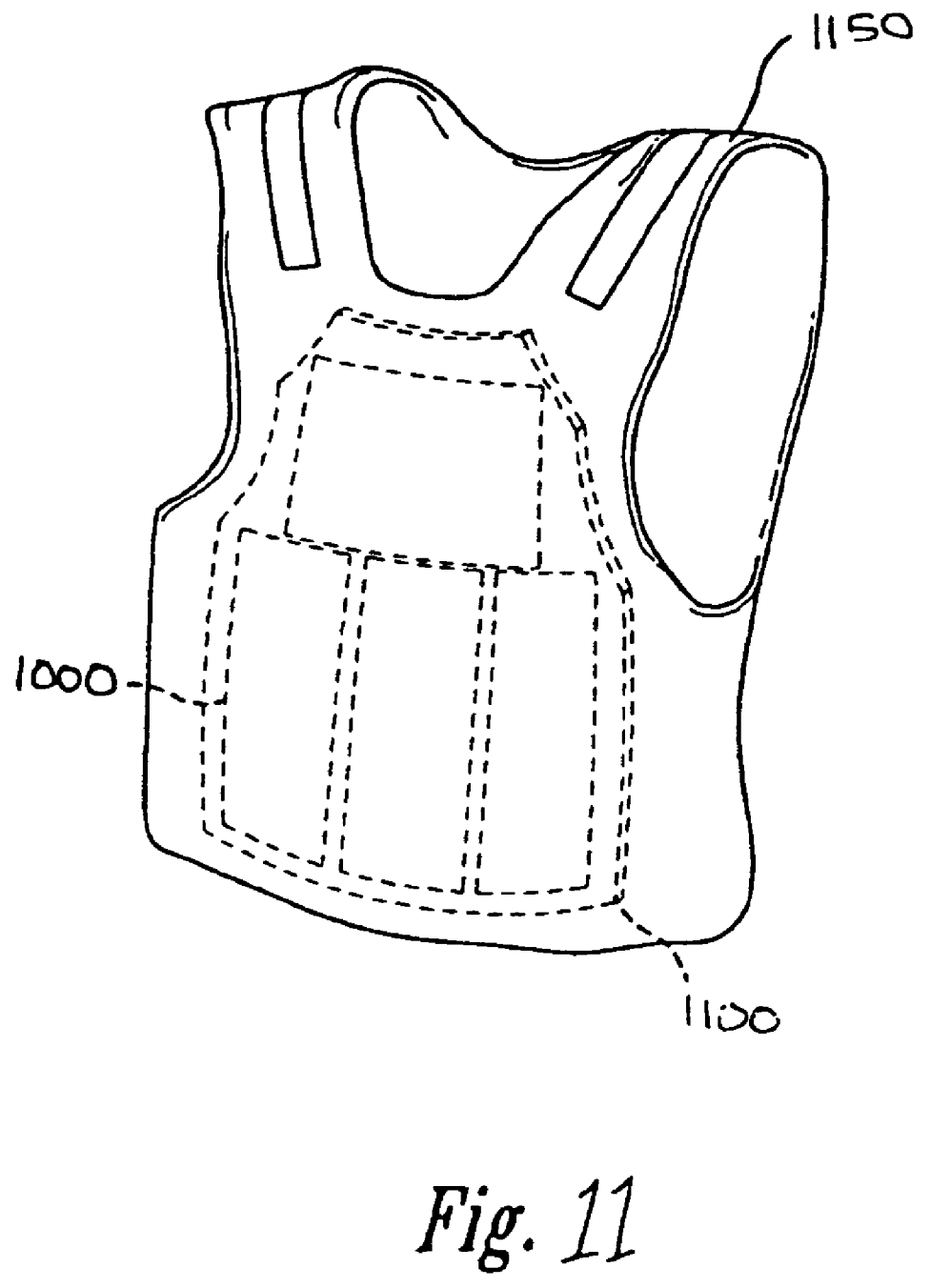

As illustrated in FIG. 10, the packets 820 or 900 are combined to form a ballistic-resistant panel 1000. As is further illustrated in FIG. 11, one or more packets 820 or 900 can be bundled together and inserted in pockets 1100 to form a ballistic-resistant panel 1000. This ballistic-resistant panel 1000 may be used as illustrated in a structure such as a vest 1150. The packets 820 or 900 increase ballistic-resistant efficiency by helping to hold the sheets in position. Traditionally, the first impact or shot to the ballistic-resistant panel 1000 caused displacement and rotation of the sheets, which resulted in a less efficient ballistic-resistant panel for second or subsequent sheets. The stitching 810 or otherwise securing the individual sheets to form packets 820 or 900, and then bundling the packets 820 or 900 together to form a ballistic-resistant panel 1000, reduces the shifting and rotation caused by the initial shot.

FIG. 12 is a partially exploded isometric view of a ballistic-resistant panel 1200 in accordance with another embodiment. The ballistic-resistant panel 1200 is formed by a plurality of ballistic-resistant fiber sheets 1202. Laminate films are not provided between the ballistic-resistant sheets 1202 in this embodiment. The sheets 1202 have the plurality of ballistic-resistant fibers 120 a set of spaced-apart bonding fibers 130 woven or bonding strips at a selected angle relative to the ballistic-resistant fibers. The bonding fibers 130 are shown in FIG. 12 at one angle although other angular orientations, including a perpendicular orientation, could be used. The bonding fibers 130 can be ballistic-resistant fibers, such as aramid fibers, coated with a selected heat and/or pressure sensitive adhesive. In one embodiment, each ballistic-resistant sheet 1202 also has a second set of spaced-apart bonding fibers 130 or bonding strips woven with the first set of bonding fibers and with the ballistic-resistant fibers 120. Accordingly, each ballistic-resistant fiber sheet 1202 is a multi-directional array of fibers.

The ballistic-resistant sheets 1202 are oriented so the ballistic-resistant fibers 120 of each sheet is cross-plied at a selected angle relative to the ballistic-resistant fibers of the adjacent sheets. The ballistic-resistant fibers 120 of adjacent sheets can be cross-plied approximately a 90° orientation, although angular orientations can be used. When the ballistic-resistant sheets 1202 are positioned together to form the panel 1200, the bonding fibers 130 in each sheet bond to the ballistic-resistant fibers 120 of the sheet and also to the ballistic-resistant fibers and/or the bonding fibers of the adjacent sheets. The bonding fibers 130 securely retain the adjacent ballistic-resistant sheets 1202 together while maintaining the desired degree of flexibility or rigidity of the ballistic-resistant panel 1200. The plurality of ballistic-resistant sheets 1202 in alternate embodiments can also be stitched together, as discussed above.

The impact of the bullet indents the ballistic-resistant panel and causes some of the fibers in the ballistic-resistant panel to compact at the front of the bullet while stretching and pulling other fibers out of position as the bullet moves through the ballistic-resistant panel. Additionally, the indentation from the force of the bullet in the ballistic-resistant panel in one location causes a resulting protrusion of the panel's flat surface surrounding the indentation. This protrusion can buckle the surface of the entire panel depending on the entry location of the bullet. This buckling creates an air pocket between the panel and the wearer's chest, which in turn impacts the integrity of the entire ballistic-resistant panel.

The various embodiments described above can be combined to provide further embodiments. All of the above U.S. Patents and applications are incorporated by reference. Aspects of the invention can be modified, if necessary, to employ the systems, circuits, and concepts of the various patents and applications described above to provide yet further embodiments of the invention.

These and other changes can be made to the invention in light of the above detailed description. In general, in the following claims, the terms used should not be construed to limit the invention to the specific embodiments disclosed in the specification and the claims, but should be construed to include all ballistic-resistant fiber sheets that operate under the claims. Accordingly, the invention is not limited by the disclosure, but instead its scope is to be determined entirely by the following claims.

The invention claimed is:

1. A ballistic-resistant laminate assembly, comprising:

a first layer having a plurality of ballistic-resistant fiber strands positioned adjacent to each other, a plurality of first bonding strips and a plurality of second bonding strips, the first bonding strips being spaced apart from each other by a selected distance, being connected to the fiber strands and being positioned at a first angle relative to the fiber strands, the second bonding strips being spaced apart from each other by a selected distance, being positioned at a second angle relative to the fiber strands, and being cross-plied with the first bonding strips and at least one of the first and second bonding strips being coated with an adhesive material and arranged in a woven arrangement with the fiber strands;

a first laminate film positioned on one side of the fiber strands and bonded with the first or second bonding strips to the first layer; and a second laminate film positioned adjacent to a side of the fiber strands opposite the first laminate film.

2. The assembly of claim 1 wherein the fiber strands are high-performance fibers having a tensile strength of at least 9 grams/denier.

3. The assembly of claim 1 wherein the first bonding strips are ballistic-resistant bonding fibers coated with an adhesive material.

4. The assembly of claim 1 wherein the adhesive material further comprises a pressure sensitive adhesive material.

5. The assembly of claim 1 wherein the second bonding strips are ballistic-resistant bonding fibers coated with an adhesive material.

6. The assembly of claim 1 wherein the second bonding strips include high aramid fibers coated with an adhesive material.

7. The assembly of claim 1 wherein the second laminate film is bonded to the first layer, with the fiber strands being laminated between the first and second laminate films.

8. The assembly of claim 1 wherein the fiber strands are first fiber strands, and further comprising a second layer having a plurality of ballistic-resistant second fiber strands positioned adjacent to each other, and a plurality of third bonding strips spaced apart from each other by a selected distance and connected to the second fiber strands, the third bonding strips being positioned at a third angle relative to the second fiber strands, the second fiber strands being cross-plied relative to the first fiber strands.

9. The assembly of claim 8 wherein the first and second fiber strands are bonded to each other with at least one of the first, second, or third bonding strips.

10. The assembly of claim 8 wherein the first and second layers are positioned immediately adjacent to each other between the first and second laminate films.

11. The assembly of claim 8 wherein one of the first and second laminate films is between the first and second layers.

12. The assembly of claim 8 wherein one of the first and second laminate films is between the first and second layers, and further comprising a third laminate film positioned adjacent to the second layer opposite one of the first and second laminate films.

13. The assembly of claim 8 wherein the first layer is between the first and second laminate films to form a first laminated layer, and further comprising third and fourth laminated layers with the second layer therebetween forming a second laminated layer adjacent to the first laminated layer.

14. A ballistic-resistant laminate assembly, comprising:

a plurality of ballistic-resistant fiber strands;

first bonding fibers spaced apart from each other and interconnecting the fiber strands, the first bonding fibers being oriented at a predetermined angle relative to the fiber strands;

second bonding fibers spaced apart from each other and connected to the fiber strands and being at a predetermined angle relative to the first bonding fibers, at least the first or second bonding fibers being ballistic-resistant fibers coated with a pressure sensitive adhesive material, the first and second bonding fibers forming a bi-directional array of bonding fibers that hold the fiber strands in a substantially parallel orientation; and a first laminate film adjacent to one side of the fiber strands and bonded to at least one of the first or second bonding fibers.

15. The assembly of claim 14 wherein the first bonding fibers are oriented at an angle between 30 degrees and 60 degrees relative to the fiber strands.

16. The assembly of claim 14 wherein the first and second bonding fibers are arranged in a substantially woven pattern with the plurality of ballistic-resistant fiber strands.

17. The assembly of claim 14 wherein the first and second bonding fibers are aramid fibers coated with the adhesive material.

18. The assembly of claim 14 wherein the first laminate film adjacent to one side of the fiber strands is further bonded to at least one of the first or second bonding fibers; and further comprising a second laminate film, the fiber strands and the array of bonding fibers being laminated and substantially sealed between the first and second laminate films with interstitial air pockets therebetween to form a laminated ballistic-resistant assembly with positive buoyancy.

19. The assembly of claim 14 wherein the fiber strands are first fiber strands, the array of bonding fibers is a first array of bonding fibers, and the first fiber strands and first array of bonding fibers form a first layer, and further comprising a plurality of ballistic-resistant second fiber strands positioned adjacent to each other, and a bi-directional second array of bonding fibers spaced apart from each other and interconnecting the second fiber strands to form a second layer cross-plied with the first layer.

20. The assembly of claim 19 wherein the first and second layers are immediately adjacent to each other.

21. The assembly of claim 19 further comprising a first laminate film is between the first and second layers.

22. The assembly of claim 19, further comprising first, second, and third laminate films, the first layer being between the first and second laminate films, and the second layer being between the second and third laminate films.

23. The assembly of claim 19 wherein one of the first bonding fibers is substantially aligned with the first fiber strands and has a first color different from a color of the fiber strands, and at least one of the second bonding fibers is substantially aligned with the second fiber strands and has a second color different from the first color and different from a color of the second fiber strands, the first and second colors providing a visual indication of the orientation of the first and second fiber strands relative to each other.

24. The assembly of claim 14 wherein the fiber strands, the array of bonding fibers and the laminate film are laminated together and form a flexible ballistic-resistant panel.

25. The assembly of claim 14 wherein the fiber strands, the array of bonding fibers and the laminate film are laminated together and form a rigid ballistic-resistant panel.

26. A ballistic-resistant laminate assembly, comprising:

a first layer having ballistic-resistant first fiber strands positioned adjacent to each other, a plurality of first bonding fibers and a plurality of second bonding fibers wherein at least one of the first and second bonding fibers further comprises at least a partial coating of a pressure sensitive adhesive, the first bonding fibers being spaced apart from each other by a selected distance and being positioned at a predetermined angle relative to the first fiber strands, and the second bonding fibers being spaced apart from each other by a selected distance and being cross-plied with the first bonding fibers;

a first laminate film positioned on one side of the first layer;

a second laminate film on a side of the first layer opposite the first laminate film;

a second layer having ballistic-resistant second fiber strands positioned adjacent to each other, a plurality of third bonding fibers, and a plurality of fourth bonding fibers, the third bonding fibers being spaced apart from each other by a selected distance and being positioned at a predetermined angle relative to the second fiber strands, and the third bonding fibers being spaced apart from each other by a selected distance and being cross-plied with the fourth bonding fibers, the second laminate film being between the first and second layers; and a third laminate film positioned on a side of the second layer opposite the second laminate film.

27. The assembly of claim 26, further comprising a fourth laminate film positioned between the second laminate film and the second layer.

28. The assembly of claim 26 wherein the first, second, third, or fourth bonding fibers are ballistic-resistant fibers coated with an adhesive material.

29. The assembly of claim 26 wherein the first, second, third, or fourth bonding fibers are further oriented at an angle between 30 degrees and 60 degrees relative to the fiber strands.

30. The assembly of claim 26 wherein the first fiber strands are aramid fibers.

31. The assembly of claim 26 wherein the first layer is substantially sealably laminated between the first and second laminate films with interstitial air pockets therebetween forming a laminated layer with positive buoyancy.

32. The assembly of claim 26 wherein the second bonding fibers are substantially parallel to the first fiber strands, and the first bonding fibers are substantially perpendicular to the second bonding fibers.

33. The assembly of claim 26 wherein the first and second bonding fibers are arranged in a woven pattern with the ballistic-resistant fiber strands.

34. The assembly of claim 26 wherein one of the first bonding fibers is substantially aligned with the first fiber strands and has a first color different from a color of the first fiber strands, and at least one of the third bonding fibers is substantially aligned with the second fiber strands and has a second color different from the first color and different from a color of the second fiber strands, the first and second colors providing a visual indication of the orientation of the first and second fiber strands relative to each other.

35. A ballistic-resistant laminate assembly, comprising:

a substantially planar first layer having a plurality of first fiber strands positioned adjacent to each other, and a plurality of bonding fibers spaced apart from each other by a selected distance and connected to the first fiber strands, the bonding fibers being at least partially coated with a pressure sensitive adhesive and positioned at a predetermined angle relative to the first fiber strands, the first layer having generally opposing first and second surfaces;

a first laminate film adhered to the first surface of the first layer;

a second laminate film adhered to the second surface of the first layer, the first and second laminate films sandwiching the first layer therebetween forming a first laminated ballistic-resistant sheet with the first fiber strands in a substantially parallel orientation;

a substantially planar second layer having a plurality of second fiber strands positioned adjacent to each other, the second layer having generally opposing third and fourth surfaces, the third surface being adhered to the second laminate film; and a third laminate film adhered to the fourth surface of the second layer, the second and third laminate films sandwiching the second layer therebetween forming a second laminated ballistic-resistant sheet connected to the first laminated ballistic-resistant sheet with the second fiber strands in a substantially parallel orientation.

36. The assembly of claim 35 wherein the first and second fiber strands are aramid fibers.

37. The assembly of claim 35 wherein the bonding fibers and the first fiber strands are arranged in a substantially woven pattern.

38. The assembly of claim 35 wherein the bonding fibers in the first layer are substantially perpendicular to the first fiber strands.

39. The assembly of claim 35 wherein the first fiber strands are cross-plied at a selected angle relative to the second fiber strands.

40. The assembly of claim 35 wherein the first layer is substantially sealed between the first and second laminate films with first interstitial air pockets therein and the second layer is substantially sealed between the second and third laminate films with second interstitial air pockets therein, the first and second air pockets providing the assembly with a positive buoyancy.

41. A flexible, multiple-layer ballistic-resistant panel comprising:

a flexible first laminated sheet including a plurality of first fiber strands positioned substantially parallel to each other and forming generally opposing first and second surfaces, a plurality of spaced-apart first bonding fibers connected to the first fiber strands and positioned at an angle relative to the first fiber strands, and a first laminate film adhered to the first surface of the first fiber strands forming first interstitial air spaces therein;

a flexible second laminated sheet positioned immediately adjacent to the first laminate sheet having a plurality of second fiber strands positioned substantially parallel to each other and forming generally opposing third and fourth surfaces, a plurality of spaced-apart second bonding fibers connected to the second fiber strands and positioned at an angle relative to the second fiber strands, and a second laminate film adhered to the third surface of the second fiber strands forming second interstitial air spaces therein; and a joining member securely retaining the first and second fiber strand laminated sheets together forming a laminated structure with positive buoyancy.

42. The ballistic-resistant panel of claim 41 wherein the first fiber strands are cross-plied at a selected angle with the second fiber strands.

43. The ballistic-resistant panel of claim 42 wherein the first fiber strands are aramid fibers.

44. The ballistic-resistant panel of claim 41 wherein the first and second bonding fibers include ballistic-resistant fibers.

45. A ballistic-resistant laminate assembly, comprising:

a substantially planar first layer having a plurality of ballistic-resistant first fiber strands positioned adjacent to each other and a plurality of ballistic-resistant bonding fibers spaced apart from each other and connected to the first fiber strands, the bonding fibers being coated with a pressure sensitive adhesive material and being positioned at a predetermined angle relative to the first fiber strands;

a first laminate film adhered to the first layer with the first fiber strands in a substantially parallel orientation, the first layer and the first laminate film forming a first laminated ballistic-resistant sheet;

a second layer having a plurality of unidirectional ballistic-resistant second fiber strands positioned adjacent to each other; and a second laminate film adhered to the second layer with the second fiber strands in a substantially parallel orientation, the second layer and the second laminate film forming a second laminated ballistic-resistant sheet connected to the first laminated ballistic-resistant sheet.

46. The assembly of claim 45 wherein the bonding fibers are substantially perpendicular to the first layer's fiber strands.

47. The assembly of claim 45 wherein the second laminate film is between the first and second fiber strands.

48. The assembly of claim 45, further comprising a third laminate film attached to the first layer sandwiching the first fiber strands between the first and third laminate films forming a first laminated layer, and further comprising a fourth laminate film attached to the second layer sandwiching the second fiber strands between the second and fourth laminate films forming a second laminated layer adjacent to the first laminated layer.

49. The assembly of claim 48 wherein the first laminated layer includes substantially sealed interstitial air spaces between the first and third laminate films, and the second laminated layer includes substantially sealed interstitial air spaces between the second and fourth laminate films, the first and second laminated layers having a positive buoyancy.

50. The assembly of claim 45 wherein the bonding fibers are aramid fibers.

51. The assembly of claim 45 wherein the bonding fibers are first bonding fibers, and further comprising a plurality of ballistic-resistant second bonding fibers coated with an adhesive material spaced apart from each other and substantially parallel with the second fiber strands, the second bonding fibers being cross-plied with the first bonding fibers forming an array of bi-directional bonding fibers.

52. The assembly of claim 51 wherein the first and second bonding fibers are arranged in a woven arrangement with the fiber strands.

53. The assembly of claim 45 wherein the first and second laminate sheets are flexible sheets joined together to form a flexible, multiple-layer ballistic-resistant panel.

54. The assembly of claim 45 wherein the first and second laminate sheets are joined together to form a rigid, multiple-layer ballistic-resistant panel.

55. A flexible, multiple-layer ballistic-resistant panel, comprising:

a first flexible, unidirectionally oriented fiber strand laminate sheet including a plurality of unidirectional first fiber strands made of ballistic-resistant fibers positioned substantially parallel to each other, a plurality of spaced-apart first bonding fibers made of a ballistic-resistant material coated with an adhesive and connected to the first fiber strands and positioned at an angle between 30 degrees and 60 degrees relative to the first fiber strands, and a first laminate film adjacent to the first fiber strands; and a second flexible, unidirectionally oriented fiber strand laminate sheet positioned adjacent to the first flexible, unidirectionally oriented fiber strand laminate sheet and having a plurality of unidirectional second fiber strands made of ballistic-resistant fibers positioned substantially parallel to each other, a plurality of spaced-apart second bonding fibers made of ballistic-resistant fibers coated with an adhesive and connected to the second fiber strands and positioned at an angle relative to the second fiber strands, and a second laminate film adjacent to the second fiber strands.

56. The panel of claim 55 wherein the first bonding fibers are substantially perpendicular to the first fiber strands.

57. The panel of claim 55 wherein the first bonding fibers and the first fiber strands are made of the same ballistic-resistant material.

58. The panel of claim 55 wherein the first unidirectionally oriented fiber strand laminate sheet has third ballistic-resistant bonding fibers coated with an adhesive material and positioned substantially parallel with the first fiber strands and cross-plied with the first bonding fibers to form an array of bi-directional, ballistic-resistant bonding fibers.

59. The panel of claim 58 wherein the second unidirectionally oriented fiber strand laminate sheet has fourth ballistic-resistant bonding fibers coated with an adhesive material and positioned substantially parallel with the second fiber strands and cross-plied with the second bonding fibers to form a second array of bi-directional, ballistic-resistant bonding fibers.

60. A ballistic-resistant laminate assembly, comprising:

a first layer having a plurality of ballistic-resistant fiber strands positioned adjacent to each other, a plurality of first bonding strips and a plurality of second bonding strips, the first bonding strips being spaced apart from each other by a selected distance, being connected to the fiber strands and being positioned at a first angle between 30 degrees and 60 degrees relative to the fiber strands, the second bonding strips being spaced apart from each other by a selected distance, being positioned at a second angle relative to the fiber strands, and being cross-plied with the first bonding strips, wherein at least one of the first and second bonding strips further comprises a bonding fiber;

a first laminate film positioned on one side of the fiber strands and bonded with the first or second bonding strips to the first layer; and a second laminate film adjacent to a side of the fiber strands opposite the first laminate film.

61. The assembly of claim 60 wherein the fiber strands are high performance fibers having a tensile strength of at least 9 grams/denier.

62. The assembly of claim 60 wherein at least one of the first and second bonding strips include ballistic-resistant fibers coated with a pressure sensitive adhesive material.

* * * * *